(12) United States Patent  (10) Patent No.: US 8,276,451 B2
Tyren  (45) Date of Patent: Oct. 2, 2012

(54) DEVICE FOR IMPROVED RESPONSE WHEN MEASURING VIBRATION FREQUENCY OF A VIBRATING OBJECT

(75) Inventor: Carl Tyren, Monaco (MC)

(73) Assignee: Sondero AB (SE)

( * ) Notice: Subject to any disclaimer, the term of this patent is extended or adjusted under 35 U.S.C. 154(b) by 225 days.

(21) Appl. No.: 12/867,322

(22) PCT Filed: Dec. 3, 2008

(86) PCT No.: PCT/SE2008/000679

§ 371 (c)(1),
(2), (4) Date: Aug. 12, 2010

(87) PCT Pub. No.: WO2009/102242

PCT Pub. Date: Aug. 20, 2009

(65) Prior Publication Data

US 2010/0319457 A1    Dec. 23, 2010

(30) Foreign Application Priority Data

Feb. 13, 2008   (SE) ...................................... 0800317

(51) Int. Cl.
*G01N 29/12*  (2006.01)
(52) U.S. Cl. ............................................ 73/597; 73/649

(58) Field of Classification Search ...................... 73/597,
73/599, 602, 627, 649, 655, 658
See application file for complete search history.

(56) References Cited

U.S. PATENT DOCUMENTS

| 4,379,226 | A | 4/1983 | Sichling et al. | |
|---|---|---|---|---|
| 4,481,825 | A * | 11/1984 | Kljuev et al. | 73/655 |
| 6,415,666 | B1 * | 7/2002 | Donskoy et al. | 73/627 |
| 6,492,933 | B1 | 12/2002 | McEwan | |
| 6,505,130 | B1 * | 1/2003 | Springer et al. | 702/40 |
| 6,545,762 | B2 * | 4/2003 | Lewis et al. | 356/502 |
| 7,073,384 | B1 * | 7/2006 | Donskoy et al. | 73/657 |
| 7,302,852 | B2 * | 12/2007 | Chien | 73/643 |

FOREIGN PATENT DOCUMENTS

| WO | 0114825 A1 | 3/2001 |
|---|---|---|
| WO | 0173389 A1 | 10/2001 |

* cited by examiner

*Primary Examiner* — J M Saint Surin
(74) *Attorney, Agent, or Firm* — Brooks Kushman P.C.

(57) ABSTRACT

A device for measuring a vibration frequency of a mechanically vibrating string or rod, comprising a microwave transmitter for directing microwaves towards the vibrating string and a microwave receiver for receiving the microwaves amplitude modulated by the frequency of mechanical vibration. A member is arranged close to a vibration maximum of the vibrating string. The member is arranged on one side of the vibrating object and the microwave receiver is arranged on the other side thereof. The device is used for measuring temperature, pressure, torque, force or identity.

19 Claims, 4 Drawing Sheets

DEVICE FOR IMPROVED RESPONSE WHEN MEASURING VIBRATION FREQUENCY OF A VIBRATING OBJECT

FIELD OF INVENTION

The present invention relates to the field of a mechanically vibrating string or rod monitored from a distance by a microwave system.

BACKGROUND OF THE INVENTION

In the early days of Radar, it was discovered that thin pieces of aluminium have a high radar reflectivity. This property was used during the World War II and was called "Chaff". An aircraft spread a cloud of small, thin pieces of for example aluminium, which either appears as a cluster of secondary targets on radar screens or swamps the screen with multiple returns. Modern armed forces use chaff, for example in naval applications, using short-range SRBOC rockets, to distract radar-guided missiles from their targets. Most military aircraft and warships have chaff dispensing systems for self-defense. The length of the chaff should be approximately half the wavelength of the radar.

The inventor of the present invention found that a metal string, which was caused to vibrate with its fundamental frequency, imposed an amplitude modulation on a microwave radiation, such as a radar signal. Thus, WO 01/73389 discloses a metal string, which is caused to vibrate. The frequency of the vibrations is dependent on the length, density and tension of the string. The vibration frequency is also influenced upon by temperature. A microwave transmitter directs an electromagnetic microwave signal towards the string and the reflections there from are received by a microwave receiver. The received signal is amplitude modulated by the frequency of the vibrating string. Thus, for example temperature can be measured from a distance. By connecting the string to a pressure membrane, so that the pressure influences upon the tension of the string and thus on the vibration frequency, the pressure can be monitored from a distance. Force and torque can also be measured indirectly.

U.S. Pat. No. 6,492,933 discloses a microwave sensor that employs single sideband Doppler techniques in innumerable vibration, motion, and displacement applications. When combined with an active reflector, the sensor provides accurate range and material thickness measurements even in cluttered environments. The active reflector can also be used to transmit multi-channel data to the sensor. The sensor is a homodyne pulse Doppler radar with phasing-type Doppler sideband demodulation having a 4-decade baseband frequency range. Ranging is accomplished by comparing the phase of the Doppler sidebands when phase modulated by an active reflector. The active reflector employs a switch or modulator connected to an antenna or other reflector. In one mode, the active reflector is quadrature modulated to provide SSB reflections. Applications for the low-cost system include a mechanical motion/rotation sensor, a robust security alarm, a throat microphone, a stereo guitar pickup, a direction sensitive cardiac monitor, an electronic dipstick, a material thickness/dielectric sensor, a metal smoothness meter, a non-contact electronic readout, an RFID tag, silent "talking" toys, a passive-emitter data link, a beam interrupter, and a gold nugget finder.

These previously known devices operate well in many applications. However, in harsh environment and at large distances, the received signal is weak and cluttered by reflexes from other objects. Thus, it may be difficult to discriminate the signal from the noise floor.

There is a need in the art for a microwave device for sensing a vibrating object with an improved signal-to-noise ratio.

SUMMARY OF THE INVENTION

Accordingly, an object of the present invention is to mitigate, alleviate or eliminate one or more of the above-identified deficiencies and disadvantages singly or in any combination.

In an aspect, there is provided a device for measuring a vibration frequency of a mechanically vibrating object, such as a string or rod, of an electrically conducting material, comprising a microwave transmitter for directing microwaves towards the vibrating object and a microwave receiver for receiving said microwaves amplitude modulated by said frequency of vibration, characterized by a member of an electrically conducting material arranged adjacent a vibration maximum of said vibrating string, in order to increase said amplitude modulation; said member being arranged at a distance which is smaller than about 3%, such as smaller than about 1%, for example smaller than 0.3% of the wavelength of the microwaves.

In an embodiment, the distance may be larger than the amplitude of the vibrations of said object, such as equal to or larger than about twice said amplitude.

In a further embodiment, the member may have a length parallel with the vibrating object, which is smaller than about 50% of the length of the vibrating object, such as smaller than about 33%, for example smaller than about 20%. The member may have a width perpendicular to the vibrating object, which is smaller than about 50% of the length of the vibrating object, such as smaller than about 33%, for example smaller than about 20%. The member may be a screw, or a ring surrounding the vibrating object. The vibrating object may be a string or a rod. The microwave transmitter may be a continuous transmitter. The microwave transmitter may operate at a frequency of between about 0.1 GHz and about 50 GHz, such as between 0.5 GHz and 30 GHz, for example between about 1.0 GHz and 10 GHz. The vibrating object may have a length which is smaller than the wavelength of the microwaves, such as smaller than half the wavelength, for example about 47.5% or 24% of the wavelength. The member may be arranged in a holder, which comprises a device for adjusting the distance between said member and said vibrating object. The member may be arranged on one side of the vibrating object and the microwave receiver is arranged on the other side thereof. The member may surround said vibrating object at all sides. The vibrating object may be a tensioned string or a beam supported at one side and free at the other side. The vibrating object may be made from a metallic material, which has a good electric conductive property, such as copper, silver, steel, or a mixture of metals. The member may be made from a metallic material, which has a good electric conductive property, such as copper, silver, steel, or a mixture of metals. The vibrating object may alternatively be made from a dielectric material, which has a surface layer of a conducting material, or completely from a dielectric material.

In a still further embodiment, two vibrating objects may be arranged at an angle in relation to each other at a rotating shaft.

In another aspect, the device mentioned above may be used for measuring temperature, pressure, torque, force or identity.

BRIEF DESCRIPTION OF THE DRAWINGS

Further objects, features and advantages of the invention will become apparent from the following detailed description of embodiments of the invention with reference to the drawings, in which.

DETAILED DESCRIPTION OF EMBODIMENTS

Below, several embodiments of the invention will be described with references to the drawings. These embodiments are described in illustrating purpose in order to enable a skilled person to carry out the invention and to disclose the best mode. However, such embodiments do not limit the invention. Moreover, other combinations of the different features are possible within the scope of the invention.

In embodiments of the invention, a vibrating string of an electrically conducting material is exposed to a continuous field of microwave radiation from a microwave transmitter.

The string is arranged for changing its fundamental vibration frequency in dependence of a property to be measured. If temperature is to be measured, the tension of the string is dependent on the temperature. In another application, one end of the string is attached to a membrane exposed to a pressure, and the tension of the string is dependent on the pressure. Such pressure may be the internal pressure of a car tire. In a further application, the string is attached to a shaft in order to measure torque in the shaft. In a yet further example, the string is exposed to a force which should be measured and which alters the frequence of vibration of the string. Other applications may be possible, such as identification of an object.

A receiving antenna picks up reflected, scattered or retransmitted microwave signals from the vibrating string at a distance. The received signal is amplitude modulated by a frequency equal to the frequency of vibration of the string.

The exact theory for the amplitude modulation is not fully understood. Without being bound by any theory, it is supposed that the amplitude modulation is due to a varying reflectivity or gain of the string when the string moves in space, similar to the directivity of an antenna being arranged close to an earth plane, as explained below.

The string may be regarded as an antenna exposed to the microwave energy from the transmitter. The microwaves induce a current in the antenna/string. The current will be larger if the antenna has a length corresponding to substantially half the wavelength of the radiation, whereby the antenna will operate as a half-wave dipole antenna. The current will be larger if the polarization plane of the microwave is parallel with the antenna, i.e. if the electric vector of the microwave is parallel with the antenna. The current induced in the antenna will be partially re-transmitted into space by the antenna in all directions, operating as dipole antenna.

Figure 1:
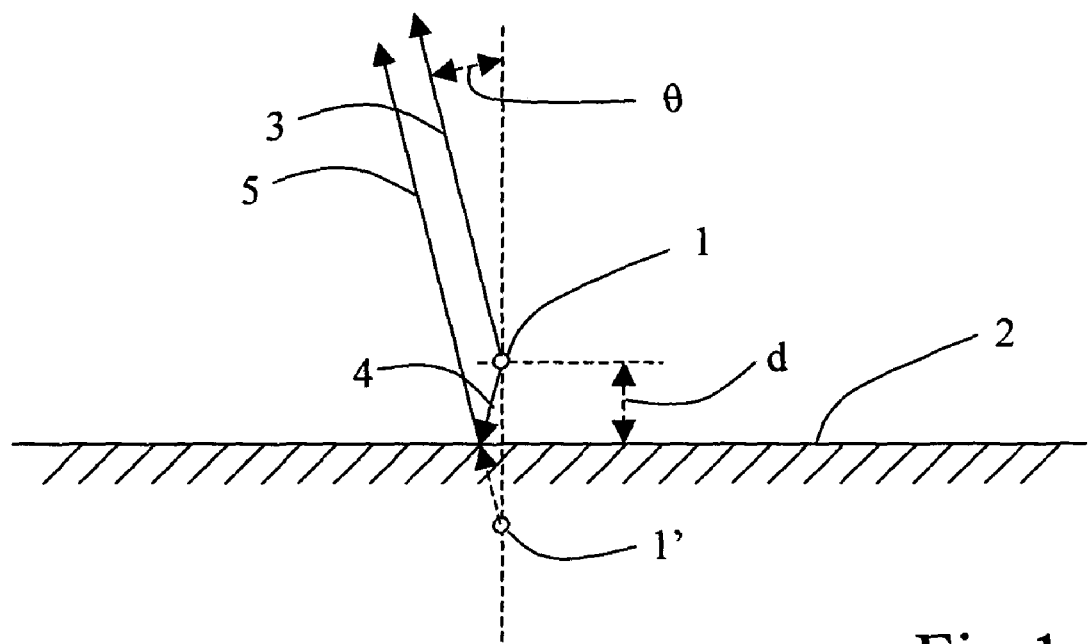
FIG. 1 is a schematic view of an embodiment of a vibrating string for explaining the principles of the invention.

FIG. 1 shows an antenna 1 arranged adjacent a ground plane 2 in parallel with such a ground plane. The antenna extends perpendicular to the paper plane and is shown as a circle. The antenna receives microwave energy and retransmits the microwave energy in all directions as indicated schematically by microwave ray 3. Another microwave ray 4 is emitted towards the ground plane and is reflected by the ground plane as microwave ray 5. At the reflection, a reversal of sign takes place. Thus, the microwave ray 5 is seen as if emitted by a virtual antenna 1' positioned at a distance d below the ground plane and with the opposite sign in relation to the antenna 1.

The two microwave rays 3 and 5 from antennas 1 and 1' will interfere and generate a dipole radiation pattern, which exhibits a gain, which is:

$$G = 2 * \sin((\pi * d/\lambda) * \cos\theta)$$

where
$\theta$ = angle to the normal of the ground plane
$d$ = the distance between the antenna and the ground plane
$G$ = the gain of the antenna at the angle $\theta$ Thus, if the distance d between the string and the ground plane is much smaller than the wavelength $\lambda$ of the microwave radiation, the gain perpendicular to the ground plane ($\cos\theta = 1$) is approximately:

$$G = 2 * \pi * d/\lambda$$

When the antenna/string vibrates, the distance d will vary as the string vibrates and the gain G will also vary. Suppose that the string vibrates with an amplitude A, then the gain at the lowest position of the string will be:

$$G_{-A} = (d-A) * 2\pi/\lambda$$

and the gain at the highest position of the string will be:

$$G_{+A} = (d+A) * 2\pi/\lambda$$

The ratio between these gains, the relative gain $G_R$, will result in the amplitude modulation of the combined microwave rays 3 and 5.

$$G_R = G_{+A}/G_{-A} = (d+A)/(d-A) = 1 + 2A/(d-A)$$

Thus, the relative gain $G_R$ will be larger the smaller the distance d is between the antenna and the ground plane. However, the gain of the antenna is also inversely proportional to the distance d, resulting in that the gain of the antenna decreases as the distance decreases. Thus, the normalized gain of the antenna $G_N$ becomes:

$$G_N = G_R/G = (\lambda/2\pi) * (1/d) * (1 + 2A/(d-A))$$

It can be shown that the normalized gain $G_N$ has a maximum when d=2A. Thus, the amplitude modulation will be maximum when the distance between the vibrating string in its position closest to the ground plane is equal to the amplitude A and the distance d between the vibrating string in its position farthest away from the ground plane is equal to three times the amplitude A, see FIG. 2. If the total amplitude 2A of the vibrating string is 0.1 mm, the distance between the string in rest and the ground plane should be 0.1 mm. This will also ensure that the string never touches the ground plane during the course of vibration.

The largest amplitude variations take place in a direction perpendicular to the ground plane. Thus, the microwave transmitter and receiver should be arranged in this direction ($\theta = 0$).

Figure 2:
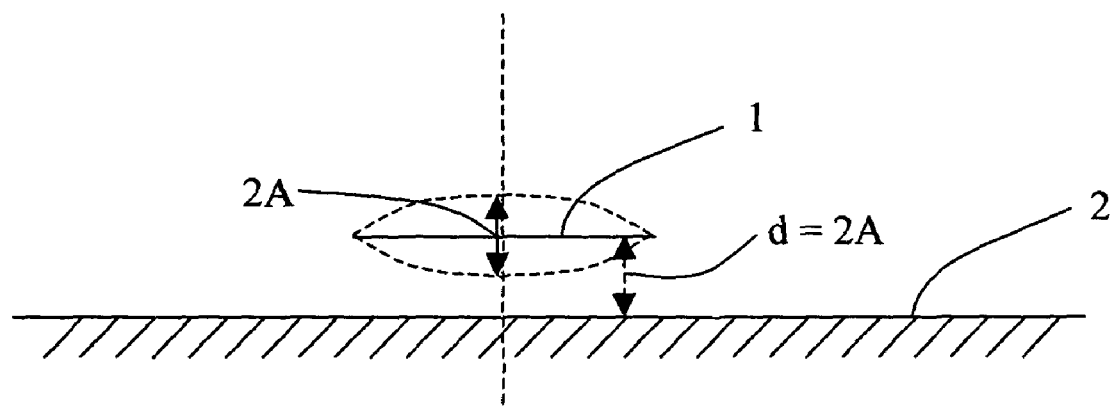
FIG. 2 is a view similar to FIG. 1 but rotated 90° in the horizontal plane in relation to FIG. 1.

As can be seen from FIG. 2, only a part of the string vibrates with a substantial amplitude. The theory above supposes that the entire length of the string moves with the same amplitude back and forth in relation to the ground plane. However, it is mainly the central portion of the string, which vibrates and contributes to the variation in gain and variation in amplitude. Thus, the ground plane may be arranged only over a part of the string, for example over the central half of the string, or even with a less extension in the string direction. The ground plane may also extend only a part at each side of the string, see further below. Such arrangement will ensure that the signal strength of the retransmitted microwave energy will not be attenuated by the ground plane.

Figure 3:
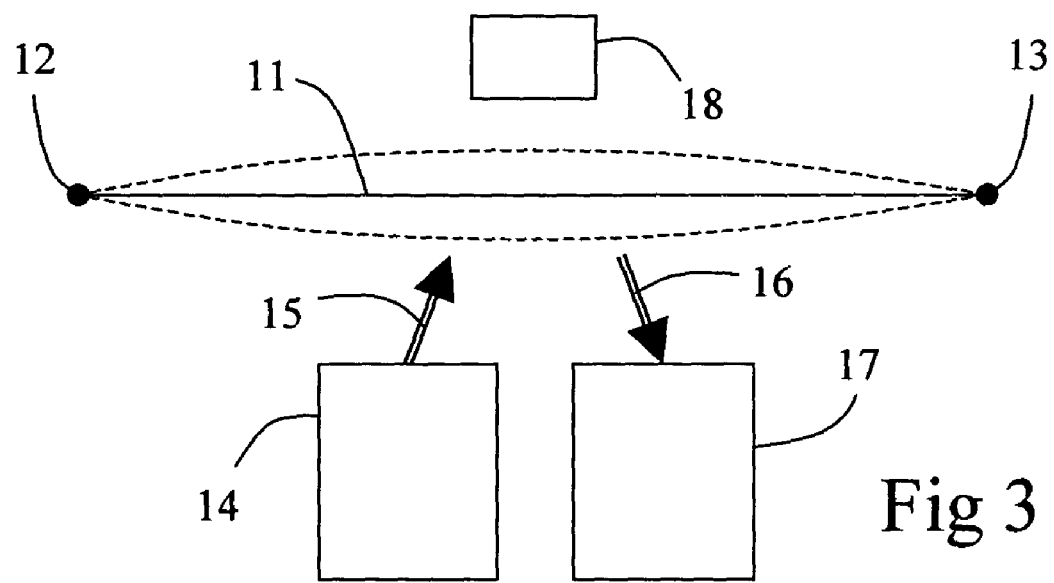
FIG. 3 is a schematic view of another embodiment of a vibrating string exposed to microwaves.

FIG. 3 shows an embodiment comprising a vibrating string 11, which is attached between two supports 12, 13. The string is a metallic string similar to a guitar string. The string is tensioned between the supports 12, 13 in any manner, known per se. The string may vibrate at a fundamental frequency and its harmonics, which are determined essentially by the length, the weight and the tension of the string.

A microwave transmitter 14 transmits microwaves 15 towards the string in a continuous mode. The string scatters or re-transmits the microwaves 16, which are picked up by a receiver 17. The transmitter 14 and the receiver 17 may be combined in a single transceiver. Several transmitters and several receivers may be used, separately or in a combination, for example with different polarization planes.

As shown in FIG. 3, a metallic member 18 is arranged adjacent to the string where it has its largest vibration amplitude, such as adjacent to the middle of the string. It has been found that the arrangement of such a member 18 close to the middle of the string results in a substantial augmentation or increase of the amplitude modulation of the received microwave signal compared to the situation when no member is present. Without being bound by a theory, it may be that such increase of the amplitude modulation is due to the fact that the metallic member 18 acts as a partial ground plane and the gain of the vibrating string will vary as the distance to the ground plane varies, as explained above. A gain of up to 5 times in the receiver has been obtained.

The metallic member 18 should be arranged close to the string, but so that the string can vibrate freely without touching the member 18.

The member 18 may be made from an electrically conducting metal, such as copper or iron, see further below.

Figure 4:
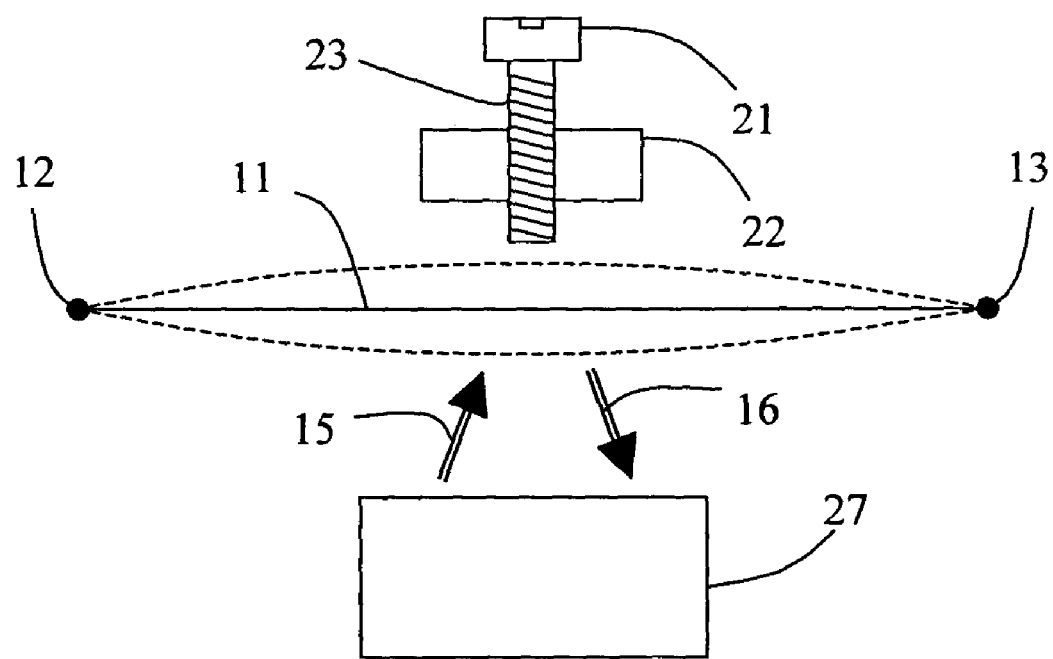
FIG. 4 is a schematic view of a further embodiment similar to FIG. 3.

As shown in FIG. 4, the transmitter and receiver may be arranged as a single microwave transceiver 27.

The member may be embodied as a screw 21 having threads 23 for movement in a support 22, which is fixed. By rotating the screw 21, the distance to the string may be adjusted. If the string has a strong tension, the amplitude of the vibrations will be small and the screw 21 can be screwed closer to the string, and vice versa. The exact distance can be tailored to the specific set-up and the vibrations of the surroundings, which set the string into vibration.

Alternatively, the screw 21 may be fixed and the support 22 can be moveable in relation to the string.

As shown in FIGS. 3 and 4, the member 18, 21, 22 is arranged at a side facing away from the microwave transceiver 14, 17, 27. Thus, the member may not disturb the microwaves and prevent them from reaching the string to be scattered and/or reflected and/or retransmitted there from.

Figure 5:
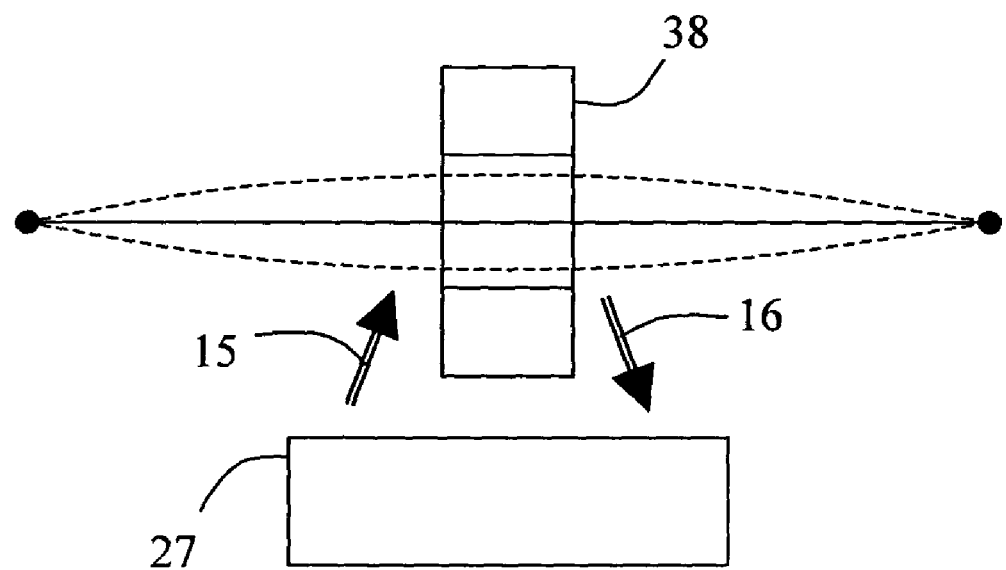
FIG. 5 is a schematic view of a still further embodiment similar to FIG. 3.

Alternatively, the member may be embodied as a ring 38 or block surrounding the string at all sides, as shown in FIG. 5. Since the string normally vibrates in all directions, such an arrangement would be advantageous in order to influence upon the string as much as possible. Theoretically, the amplitude modulation should be by the double frequency as the string fundamental frequency, since movements in any direction from the central rest position will result in an altered gain. However, because the string vibrates in all directions, a substantial amplitude modulation by the string fundamental frequency will be obtained.

Figure 6:
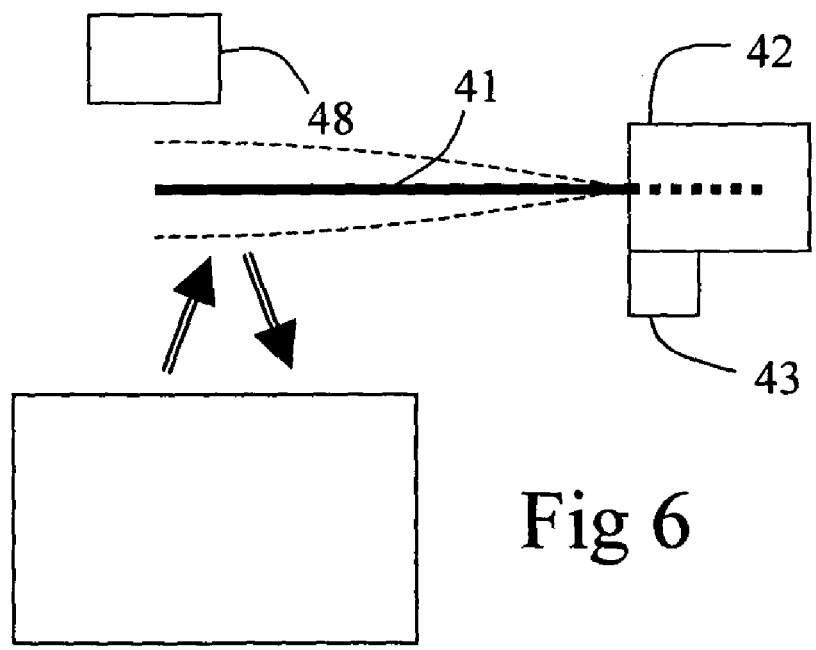
FIG. 6 is a schematic view of an alternative vibrating element.

In the above embodiments, a vibrating string has been shown. However, the string may be replaced by a vibrating beam 41 as shown in FIG. 6. The beam 41 is rigidly attached to a support block 42, for example by being inserted in a hole therein and welded or soldered or clamped therein. The member 48 is arranged as close as possible to the position in which the beam has its largest vibrations or fluctuations. The vibration frequency of the beam is influenced upon by the temperature, and such an embodiment will be suitable for temperature measurements.

The string or the beam may be excited into vibrations by any means. Often, the string or beam is arranged in a vibrating energy rich environment, wherein the string/beam may pick up vibration energy from the surroundings. Alternatively or additionally, an exciting unit 43 may be arranged at the support block 42, for example a piezo-electric crystal, which is fed by an electric alternating voltage.

Figure 7:
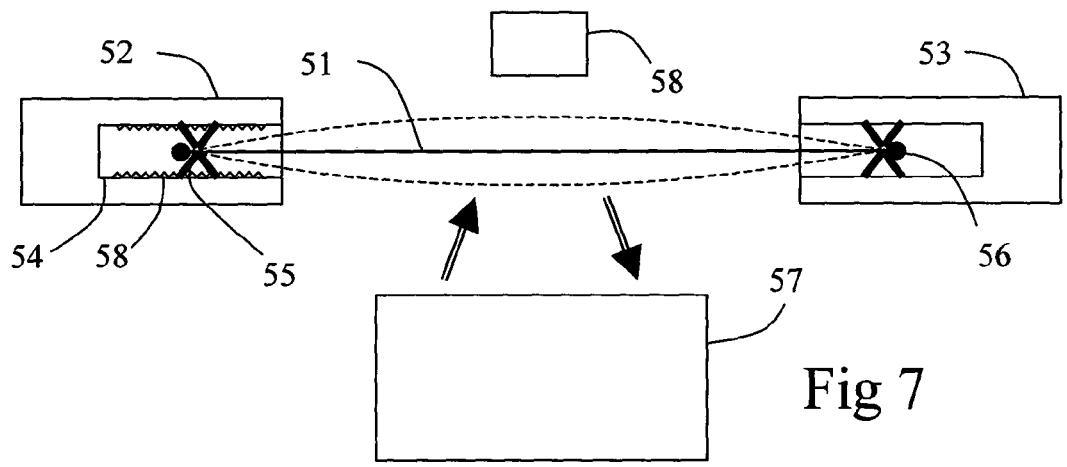
FIG. 7 is a schematic view of a yet further embodiment similar to FIG. 3.

FIG. 7 shows that the string is supported at its end by sleeves 52, 53. Each sleeve comprises a blind hole 54, in which a restriction 55 is arranged. The string is forced beyond the restriction 55, which keeps the string in place. The string may comprise an enlargement 56, which after having passed the restriction 55 prevents the string from exiting the hole. Alternatively or additionally, the string may be attached to the restriction by gluing, welding, soldering or any similar means. The string may be passed beyond the restriction in an initial open state, whereupon the sleeve is compressed so that the restriction 55 grasps the string by frictional forces and or by deforming the material of the string.

The restriction and the sleeve may be made from an electrically conducting material. Alternatively, the restriction can be made from an insulating or dielectric material, so that the string is electrically isolated from the surrounding support structure. The entire sleeve may also be made from a dielectric material.

The sleeves are in turn supported by a frame not shown so that the string is kept in tension. The axial position of the sleeves may be adjusted so that the string obtains the intended tension and vibration frequency. Another manner to adjust the tension would be to provide the inner surface of the blind hole 54 with internal threads as indicated by 58 in FIG. 7. By rotating the entire sleeve in relation to the restriction 55, the axial position of the restriction can be adjusted.

Without being bound by any theory, it may be that the string forms a part of a dipole antenna, which is arranged close to a ground plane embodied by the member 18. When the string vibrates, the distance to the ground plane change.

At present, the exact mechanism of operation is unknown. It is not known if the effect observed is due to amplitude modulation or phase modulation or both, or if further mechanisms are involved.

It has been found that the amplitude modulation is increased if the distance between the string and the member 18, 21, 22, 38, 48, 58, 68 etc is smaller than about 3% of the wavelength, or smaller than 1% of the wavelength, such as smaller than 0.3% of the wavelength. The distance is calculated as the distance from the string in rest, with no vibrations, and the member 18 etc. However, the distance should be larger than the amplitude of the string vibrations.

In an embodiment, there is used microwaves at a frequency of 2.45 GHz, the wavelength of which is 122 mm. The string length should be about 58 mm. The amplitude of vibrations is estimated to less than about 0.05 mm, resulting in that the distance should be about 0.1 mm. The distance should be smaller than 3.7 mm (3%), such as smaller than 1.2 mm (1%), for example smaller than 0.37 mm (0.3%).

For microwaves at a frequency of 24 GHz, the wavelength is 12.5 mm. The string length should be 5.9 mm. The amplitude of vibrations is estimated to less than about 0.01 mm, resulting in that the distance should be about 0.02 mm. The distance should be smaller than 0.38 mm (3%), such as smaller than 0.13 mm (1%). Since it would be difficult to arrange the member as close as 0.02 mm, a distance of about 0.1 mm may be selected. However, the amplitude modulation will then be smaller compared to the situation in the preceding paragraph with a frequency of 2.45 GHz.

If the string is insulated from the surroundings, it may form a dipole antenna. In this case, the antenna may have a length, which is so related to the wavelength of the microwaves that a high frequency electrical resonance is obtained. For example, if the microwave frequency is 2.45 GHz, the string length may be 58 mm corresponding to 95% of half the wavelength.

The member 18 etc may have an extension in the direction parallel with the string, which is smaller than half the length of the string, such as smaller than one third or one fourth or one fifth of the string length. In this way, the member 18 will be arranged at a position in which the influence on the amplitude modulation will be largest.

The member 18 etc may have an extension in the direction perpendicular to the string, which is smaller than half the length of the string, such as smaller than one third or one fourth or one fifth of the string length. In this way, the member 18 will be arranged at a position in which the influence on the amplitude modulation will be largest.

The member may be arranged symmetrically around the middle of the string.

The member may be made from a conducting material, such as iron, steel, copper, silver, etc.

If the string is insulated from the surroundings, for example by arranging the restrictions 55 of an insulating material and the sleeves are made from en electrically conducting material, the ends of the string will be arranged close to the ground, which may also influence upon the reflection or scattering or retransmission of the microwaves.

Figure 8:
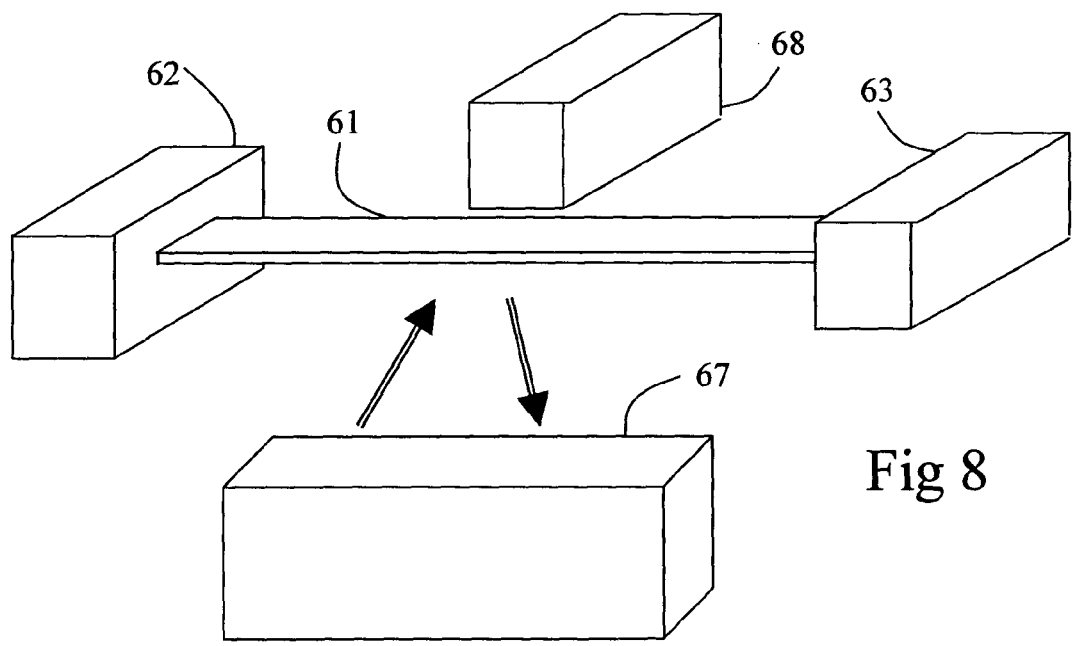
FIG. 8 is a schematic view of a vibrating element having a rectangular cross-section.

The string 11 etc may have a circular cross-sectional area as a normal guitar string. However, in a further embodiment, the string may have a rectangular cross-sectional area so that the string vibrates, with a string behavior, essentially only in one direction, parallel to the smallest side in the rectangle and in its orthogonal plane primarily oscillates in a beam manner at another frequency. Such an embodiment is shown in FIG. 8, wherein a string 61 has a rectangular cross-sectional area. The ends of the string are attached to metal support blocks 62, 63, by welding or soldering or clamping. A metal block member 68 is arranged close to the middle of the string 61 on the opposite side in relation to the microwave transceiver.

The string may be made from any metallic material, which has a good electric conductive property, such as copper, silver, steel, or a mixture of metals.

Alternatively, the string may be made from a dielectric material, which has a surface layer of a conducting material, or completely from a dielectric material. Other materials, such as amorphous materials can also be used.

The string 11 can be used for measuring the temperature of the surrounding environment, since the string vibration frequency is dependent on the temperature in relation to changes in the conductivity or elasticity module E with temperature. Thus, the temperature can be measured from a distance.

If the string 11 is attached to a pressure membrane, upon which a pressure is exerted, the pressure will influence upon the frequency and can be measured at a distance.

Two strings may be arranged in different directions on a rotating shaft in order to measure the torque transmitted by the shaft. The strings may be arranged as a normal torque sensor, perpendicular to each other. A torque in the shaft will then increase the tension in one of the strings and decrease the tension in the other string. Thus, the difference between the string frequencies is related to the torque.

The microwaves should be directed essentially perpendicular to the string to obtain the largest modulation of the microwaves. Moreover, the microwaves should have a polarization so that the electric component of the microwaves is substantially parallel with the direction of the string.

The frequency of microwaves should be between about 0.1 GHz and about 50 GHz, such as between 0.5 GHz and 30 GHz, for example between about 1.0 GHz and 10 GHz. In an embodiment, microwaves of 2.45 GHz have been used.

The transmitter and receiver should be arranged close to the string, such as less than about 10 m, such as less than about 3 m, for example about 0.5 m or 0.2 m from the string. The transmitter and the receiver may be arranged at substantially the same distance, although the transmitter or receiver may be arranged at a larger distance than the other.

The microwaves may be continuously transmitted microwaves and the receiver may be provided with a circulator of a conventional design in order to separate transmitted microwaves from received microwaves. In another embodiment, the transmitter and receiver may be pulsed or arranged as Doppler radar equipment.

When two strings are used for example on a rotating shaft, it may be advantageous to use two or several microwave transmitters having different directions and polarizations and possibly also different frequencies.

The vibrations of the string can be detected at a large distance, such as 10 meters or more. However, the microwave transmitter may be arranged close to the string.

The length of the string may be related to the microwave wavelength so that the string acts as an antenna, for example a half-wave dipole antenna or a quarter-wave antenna. As is conventional, the length of the antenna should be about 95% of half the wavelength of the microwaves in order to take account of the difference in the velocity of wave propagation in the string as opposed to the same wave in free space.

However, the embodiments work fine also when the string is no multiple of a quarter of the wavelength, for example much longer than the wavelength.

For example, the vibrations of a guitar having steel strings may be picked up at a large distance from the guitar by use of a microwave transmitter and receiver. The length of the strings may be 600 mm or more and the microwave wavelength may be 122 mm. The vibrations may be picked up at a distance of up to 10 meters. Thus, this embodiment of the invention may for example replace traditional magnetic pick-ups on a guitar for electronic amplification, for example during a concert.

Although the present invention has been described above with reference to specific embodiment, it is not intended to be limited to the specific form set forth herein. Rather, the invention is limited only by the accompanying claims and, other embodiments than the specific above are equally possible within the scope of these appended claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A device for measuring a vibration frequency of a mechanically vibrating object, such as a string or rod, of an electrically conducting material, comprising
   a microwave transmitter for directing microwaves towards the vibrating object and a microwave receiver for receiving said microwaves amplitude modulated by said frequency of vibration,
   characterized by
   a member of an electrically conducting material arranged adjacent a vibration maximum of said vibrating object, in order to increase said amplitude modulation;
   said member being arranged at a distance which is smaller than about 3%, such as smaller than about 1%, for example smaller than 0.3% of the wavelength of the microwaves.

2. The device according to claim 1, wherein said distance (d) is larger than the amplitude (A) of the vibrations of said object, such as equal to or larger than about twice said amplitude.

3. The device according to claim 1, wherein said member has a length parallel with the vibrating object, which is smaller than about 50% of the length of the vibrating object, such as smaller than about 33%, for example smaller than about 20%.

4. The device according to claim 1, wherein said member has a width perpendicular to the vibrating object, which is smaller than about 50% of the length of the vibrating object, such as smaller than about 33%, for example smaller than about 20%.

5. The device according to claim 1, wherein said member is a screw.

6. The device according to claim 1, wherein said member is a ring surrounding said vibrating object.

7. The device according to claim 1, wherein said vibrating object is a string or a rod.

8. The device according to claim 1, wherein the microwave transmitter is a continuous transmitter.

9. The device according to claim 1, wherein the microwave transmitter operates at a frequency of between about 0.1 GHz and about 50 GHz, such as between 0.5 GHz and 30 GHz, for example between about 1.0 GHz and 10 GHz.

10. The device according to claim 1, wherein the vibrating object has a length which is smaller than the wavelength of the microwaves, such as smaller than half the wavelength, for example about 47.5% or 24% of the wavelength.

11. The device according to claim 1, wherein said member is arranged in a holder, which comprises a device for adjusting the distance between said member and said vibrating object.

12. The device according to claim 1, wherein said member is arranged on one side of the vibrating object and the microwave receiver is arranged on the other side thereof.

13. The device according to claim 1, wherein said member is surrounding said vibrating object at all sides.

14. The device according to claim 1, wherein said vibrating object is a tensioned string or a beam supported at one side and free at the other side.

15. The device according to claim 1, wherein said vibrating object is made from a metallic material, which has a good electric conductive property, such as copper, silver, steel, or a mixture of metals.

16. The device according to claim 1, wherein said member is made from a metallic material, which has a good electric conductive property, such as copper, silver, steel, or a mixture of metals.

17. The device according to claim 1, wherein said vibrating object is made from a dielectric material, which has a surface layer of a conducting material, or completely from a dielectric material.

18. The device according to claim 1, comprising two vibrating objects arranged at an angle in relation to each other at a rotating shaft.

19. Use of a device according to claim 1, for measuring temperature, pressure, torque, force or identity.

* * * * *